US009944817B2

(12) United States Patent
Shigenai et al.

(10) Patent No.: US 9,944,817 B2
(45) Date of Patent: Apr. 17, 2018

(54) COMPOSITE PARTICLES, COATING POWDER, COATING FILM, LAMINATE, AND METHOD FOR PRODUCING COMPOSITE PARTICLES

(71) Applicant: DAIKIN INDUSTRIES, LTD., Osaka-shi, Osaka (JP)

(72) Inventors: Fumiko Shigenai, Settsu (JP); Yasukazu Nakatani, Settsu (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 177 days.

(21) Appl. No.: 14/386,038

(22) PCT Filed: Feb. 28, 2013

(86) PCT No.: PCT/JP2013/055454
§ 371 (c)(1),
(2) Date: Sep. 18, 2014

(87) PCT Pub. No.: WO2013/146078
PCT Pub. Date: Oct. 3, 2013

(65) Prior Publication Data
US 2015/0030857 A1 Jan. 29, 2015

(30) Foreign Application Priority Data
Mar. 26, 2012 (JP) ................. 2012-070350

(51) Int. Cl.
C09D 127/18 (2006.01)
C08J 3/12 (2006.01)
C09D 5/03 (2006.01)
C08J 3/00 (2006.01)
C09D 127/20 (2006.01)

(52) U.S. Cl.
CPC ............ *C09D 127/18* (2013.01); *C08J 3/005* (2013.01); *C08J 3/12* (2013.01); *C08J 3/126* (2013.01); *C09D 5/03* (2013.01); *C09D 5/031* (2013.01); *C09D 5/033* (2013.01); *C09D 127/20* (2013.01); *C08J 2327/12* (2013.01); *C08J 2327/18* (2013.01); *C08J 2479/08* (2013.01); *C08J 2481/04* (2013.01); *C08L 2205/03* (2013.01); *Y10T 428/3154* (2015.04)

(58) Field of Classification Search
CPC .... C09D 127/18; C09D 127/20; C09D 5/031; C09D 5/033; C09D 5/03; C08J 3/005; C08J 3/12; C08J 3/126; C08J 2327/12; C08J 2327/18; C08J 2479/08; C08J 2481/04; Y10T 428/3154; C08L 2205/03
See application file for complete search history.

(56) References Cited

U.S. PATENT DOCUMENTS

| | | | |
|---|---|---|---|
| 3,085,083 A * | 4/1963 | Schreyer ................. | C08F 8/00 174/110 FC |
| 5,223,562 A | 6/1993 | Sagawa et al. | |
| 5,356,971 A | 10/1994 | Sagawa et al. | |
| 5,470,893 A | 11/1995 | Sinclair-Day et al. | |
| 5,856,378 A | 1/1999 | Ring et al. | |
| 6,232,372 B1 | 5/2001 | Brothers et al. | |
| 6,911,489 B2 * | 6/2005 | Baron ..................... | C08J 3/16 521/79 |
| 7,487,928 B2 * | 2/2009 | Boulanger ............. | B02C 17/20 241/184 |
| 2004/0239047 A1 * | 12/2004 | Kent ..................... | F16J 15/064 277/628 |
| 2006/0173100 A1 | 8/2006 | Lee et al. | |
| 2009/0029121 A1 * | 1/2009 | Hammermann ....... | B41M 5/267 428/195.1 |
| 2011/0027582 A1 | 2/2011 | Mikame et al. | |

FOREIGN PATENT DOCUMENTS

| | | |
|---|---|---|
| EP | 1564270 A1 | 8/2005 |
| JP | 5-247380 A | 9/1993 |
| JP | 5-508430 A | 11/1993 |
| JP | 7-41699 A | 2/1995 |
| JP | 2003-524663 A | 8/2003 |
| JP | 2011-74399 A | 4/2011 |
| WO | 2009/119493 A1 | 10/2009 |

OTHER PUBLICATIONS

Jung, S.; Latex, 2004, p. 103-106.*
Walter, D.; Primary Particles—Agglomerates—Aggregates, in Nanomaterials, 2013, p. 9-91.*
Sigma-Aldrich Particle Size Conversion Table, p. 1-2, retrieved Nov. 18, 2016.*
Patil, K.D.; Mechanical Operations: Fundamental Principles and Applications, 2009, p. 4.13-4.14.*
International Preliminary Report on Patentability dated Oct. 1, 2014, issued by the International Searching Authority in counterpart International application No. PCT/JP2013/055454.
International Search Report of PCT/JP2013/055454, dated May 21, 2013. [PCT/ISA/210].
Communication dated Sep. 18, 2015 from the European Patent Office in counterpart application No. 13767832.2.
Database CA [Online] Chemical Abstracts Service, Columbus, Ohio, US; Maruyama, Toshinori et al: "Resin composites with uniformly dispersed poly(tetrafluoroethylene) powder", XP002744126, retrieved from STN Database accession No. 1974:414267 abstract* -& JP S48 17662 B (Nippon Valqua Industries, Ltd.) May 31, 1973 (May 31, 1973).

* cited by examiner

Primary Examiner — Robert Jones, Jr.
(74) Attorney, Agent, or Firm — Sughrue Mion, PLLC

(57) ABSTRACT

An object of the present invention is to provide a particulate composite which is free from fluorosurfactants having a high environmental impact, and can form a coating film that has excellent adhesion to a substrate and is uniformly adhered to the substrate even if containing a small amount of an adhesive component. The particulate composite of the present invention contains: a fluoropolymer; an adhesive polymer; and less than 0.1 ppm of a fluorosurfactant.

16 Claims, 6 Drawing Sheets

COMPOSITE PARTICLES, COATING POWDER, COATING FILM, LAMINATE, AND METHOD FOR PRODUCING COMPOSITE PARTICLES

CROSS REFERENCE TO RELATED APPLICATIONS

This application is a National Stage of International Application No. PCT/JP2013/055454 filed Feb. 28, 2013, claiming priority based on Japanese Patent Application No. 2012-070350, filed Mar. 26, 2012, the contents of all of which are incorporated herein by reference in their entirety.

TECHNICAL FIELD

The present invention relates to a particulate composite usable for coating powder, a coating powder containing the particulate composite, a coating film formed from the coating powder, a laminate including the coating film, and a method for producing a particulate composite.

BACKGROUND ART

Fluororesins are widely used in the form of a coating composition which is applied to a substrate for a product (e.g. molds for bread, rice kettles) requiring properties such as corrosion resistance, non-stickiness, and heat resistance, so that a fluororesin layer is formed. Fluororesins, however, have poor adhesion to substrates made of, for example, metal or ceramic because of their non-non-stickiness. Hence, before the application, a substrate is coated with a primer having compatibility with both fluororesins and the substrate.

For uses requiring corrosion resistance, generally, a fluororesin layer needs to be thick. To produce a thick layer, coating has to be repeated which includes applying a coating powder containing a fluororesin and baking the material at temperatures not lower than the melting point of the fluororesin. The primer used is required to have sufficient heat-resistant adhesion to bear long-time high-temperature baking and maintain adhesion to components such as a substrate.

Primers with excellent heat-resistant adhesion having been widely used are chromium (III) phosphate primers which have excellent resistance to long-time high-temperature baking. However, the concerns about the environmental problems have increased, and thus have led to a long-time strong demand for development of chromium-free primers that do not contain hexavalent chromium but have heat-resistant adhesion as high as chromium (III) phosphate primers.

The chromium-free primers having been studied up until now are combinations of fluororesins and various binder resins. For binder resins, use of polyphenylene sulfide [PPS] has been suggested in terms of heat resistance. PPS, however, has a disadvantage of poor compatibility with fluororesins, exhibiting insufficient adhesion to fluororesin layers.

To overcome the disadvantage, technologies for improving adhesion to fluororesin layers have been developed. Patent Literature 1, for example, discloses a coating powder which contains a macromolecule compound (A) having an amide group and/or imide group, an anti-oxidizing material (B) and a fluororesin (C), wherein the macromolecule compound (A) has an average particle size of smaller than 50 μm.

Patent Literature 2 discloses a composition usable as a multilayer coated primer, which comprises a plurality of multicomponent particles, one component of each of the particles being melt-fabricable fluoropolymer and another component of each of the particles being a high temperature resistant non-dispersed polymer binder. The composition of Patent Literature 2 is in the form of powder which is free-flowing and not subject to segregation of components during shipping or processing.

Although not for use as a primer, Patent Literature 3 discloses a method for producing a heat-meltable fluororesin composite composition which includes a process (I) of obtaining a heat-meltable fluororesin powdery mixture composition by mixing heat-meltable fluororesin fine powder and a layered compound; and a process (II) of melting and mixing the powdery mixture composition under shear stress by means of a melt-mixing extruder.

CITATION LIST

Patent Literature

Patent Literature 1: WO 2009/119493
Patent Literature 2: JP 2003-524663 T
Patent Literature 3: JP 2011-74399 A

SUMMARY OF INVENTION

Technical Problem

Materials of a coating powder are desired to be free from substances with a high environmental impact, and be able to form a coating film that has excellent adhesion to a substrate and is uniformly adhered to the substrate. Conventional coating powder need to be mixed with a large amount of an adhesive component to form a coating film uniformly adhered to a substrate.

The present invention provides a particulate composite which is free from fluorosurfactants with a high environmental impact, and can form a coating film that has excellent adhesion to a substrate and is uniformly adhered to the substrate even if containing a small amount of an adhesive component.

Solution to Problem

The present invention relates to a particulate composite containing: a fluoropolymer; an adhesive polymer; and less than 0.1 ppm of a fluorosurfactant.

The particulate composite is preferably obtainable by bonding particles of the fluoropolymer and particles of the adhesive polymer.

The particulate composite is preferably obtainable by bonding particles of the fluoropolymer and particles of the adhesive polymer with a device configured to cause centrifugal diffusion and a vortex.

Particles of the particulate composite are preferably floating in the water without making the water cloudy after the particles are dispersed in water and the resulting dispersion is left to stand for a sufficient amount of time.

The particulate composite preferably has an average particle size of 1 to 1000 μm.

The particulate composite preferably contains the fluoropolymer and the adhesive polymer in a mass ratio of 5/50 to 99/1.

The adhesive polymer is preferably at least one compound selected from the group consisting of polyimide, polyamide-imide, polyamide, polyamide acid (polyamic acid), epoxy resin, polysulfide, polyarylene sulfide, and polyether sulfone.

The fluoropolymer is preferably at least one fluororesin selected from the group consisting of a tetrafluoroethylene-perfluoro(alkyl vinyl ether) copolymer, a tetrafluoroethylene-hexafluoropropylene copolymer, and a tetrafluoroethylene-ethylene copolymer.

The present invention also relates to a coating powder containing the above particulate composite.

The present invention also relates to a coating film formed from the above coating powder.

The present invention also relates to a laminate containing a metal substrate, and the above coating film which is adhered to the metal substrate with an adhesion strength of 50 to 300 N/cm.

In the laminate of the present invention, the adhesion strength between the coating film and the metal substrate preferably has a standard deviation of less than 10.

The present invention also relates to a method for producing the above particulate composite, the method including the steps of: placing a fluoropolymer and an adhesive polymer in a surface treating device; mixing the fluoropolymer and the adhesive polymer in the surface treating device to obtain a particulate composite; and collecting the particulate composite from the surface treating device.

The surface treating device is preferably a high-speed fluidizing mixer, a high-speed rotary impact crusher, or an attrition mill.

The surface treating device is preferably an attrition mill.

Advantageous Effects of Invention

The particulate composite of the present invention having the above structure has a low environmental impact and does not deteriorate the inherent features of the fluoropolymer. The particulate composite, when used for a coating powder, can form a coating film that has excellent adhesion to a substrate and is uniformly adhered to the substrate even if containing a small amount of an adhesive component.

DESCRIPTION OF EMBODIMENTS

Figure 1:
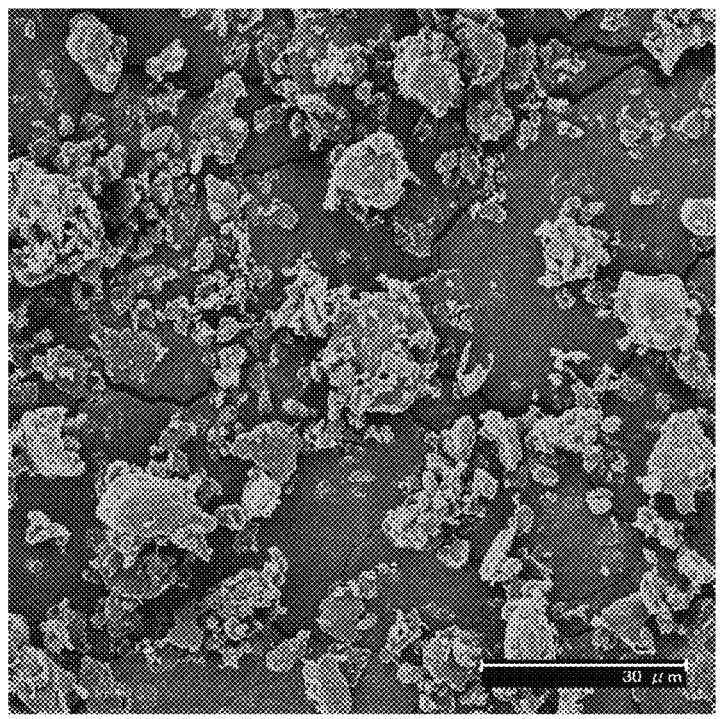
FIG. 1 is a scanning electron microscope photograph of the surface of a particulate composite obtained in Example 4.

Hereinafter, the present invention is specifically described.

The particulate composite of the present invention contains a fluoropolymer, an adhesive polymer, and less than 0.1 ppm of a fluorosurfactant. The particulate composite of the present invention enables formation of a coating film with excellent adhesion to a substrate. Also, the coating film is uniformly adhered to the substrate.

The particulate composite of the present invention is designed to agglomerate the particles of a fluoropolymer and the particles of an adhesive polymer to eliminate separation of the fluoropolymer and the adhesive polymer at the time of coating. Such a particulate composite enables formation of a coating film that has excellent adhesion to a substrate and is uniformly adhered to the substrate even if containing a smaller amount of an adhesive component than conventional particulate composites.

Furthermore, since the proportion of the fluororesin can be increased, the adhesion to a top coat layer can be further increased when used as a primer.

The particulate composite of the present invention contains less than 0.1 ppm of a fluorosurfactant. A coating film formed from the particulate composite of the present invention is therefore free from fluorosurfactants, thereby exhibiting a low environmental impact and the inherent features of the fluoropolymer. Also, deterioration in the adhesion of such a coating film to the substrate, which can be caused by a residual fluorosurfactant, does not occur.

The above fluorosurfactant content can be achieved by use of a fluoropolymer obtained by suspension polymerization. In suspension polymerization, fluorosurfactants are not used. Accordingly, with a fluoropolymer obtained by suspension polymerization, a particulate composite containing less than 0.1 ppm of a fluorosurfactant can be obtained.

The fluorosurfactant is a known fluorosurfactant used in emulsion polymerization for obtaining a fluoropolymer. The fluorosurfactant may be any compound having fluorine atoms and capable of functioning as a surfactant, such as ammonium perfluorooctanoate (PFOA).

The fluorosurfactant concentration can be measured by extracting fluorosurfactants contained in the particulate composite in acetone by Soxhlet extraction, and measuring the concentration in acetone with a mass spectrometer Quattro micro GC from Nihon Waters K.K. The limit of detection in this measurement method is 0.1 ppm. That is, what is meant by "containing less than 0.1 ppm of a fluorosurfactant" is that the fluorosurfactant contained in the particulate composite cannot be detected.

The particulate composite of the present invention can be suitably used for a coating powder. A coating powder containing the particulate composite of the present invention, when applied to a substrate, can form a coating film that has excellent adhesion to a substrate and is uniformly adhered to the substrate.

Since the particulate composite of the present invention contains agglomerates of the fluoropolymer and the adhesive polymer, the electric charge amount for the particulate composite can be controlled. The particulate composite is therefore suitable particularly as the material of a coating powder used for electrostatic coating.

The particulate composite of the present invention is preferably obtained by bonding particles of the fluoropolymer and particles of the adhesive polymer. The method for bonding particles of the fluoropolymer and particles of the adhesive polymer may be, for example, placing particles of the fluoropolymer and particles of the adhesive polymer in the later-described surface treating device, and treating the particles.

The word "bonding" as used herein means that the particles of the fluoropolymer and the particles of the adhesive polymer are integrally bonded such that the particles are floating in the water without making the water cloudy after the particles are dispersed in water and the resulting dispersion is left to stand for a sufficient amount of time.

Figure 12:
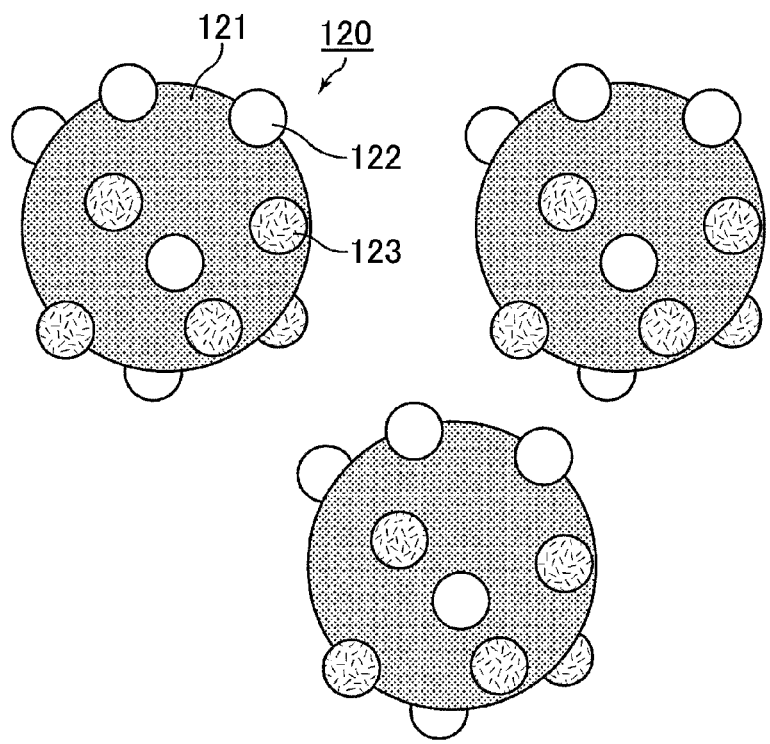
FIG. 12 is a schematic view of a structure in which particles of a fluoropolymer and an adhesive polymer are bonded to each other.

FIG. 12 is a schematic view of a structure in which particles of a fluoropolymer and an adhesive polymer are bonded to each other. As illustrated in FIG. 12, if each particle of a particulate composite 120 is a particle in which adhesive polymer particles 122 and 123 are bonded to a fluoropolymer particle 121, the particulate composite 120, when applied to a substrate, forms a coating film in which the adhesive polymer particles are uniformly distributed, so that the coating film is uniformly adhered to the substrate. In this way, the adhesive polymer particles efficiently work, and thereby the amount of the adhesive polymer particles to be added to the coating powder containing the particulate composite of the present invention can be decreased compared to the conventional particulate composites.

Figure 13:
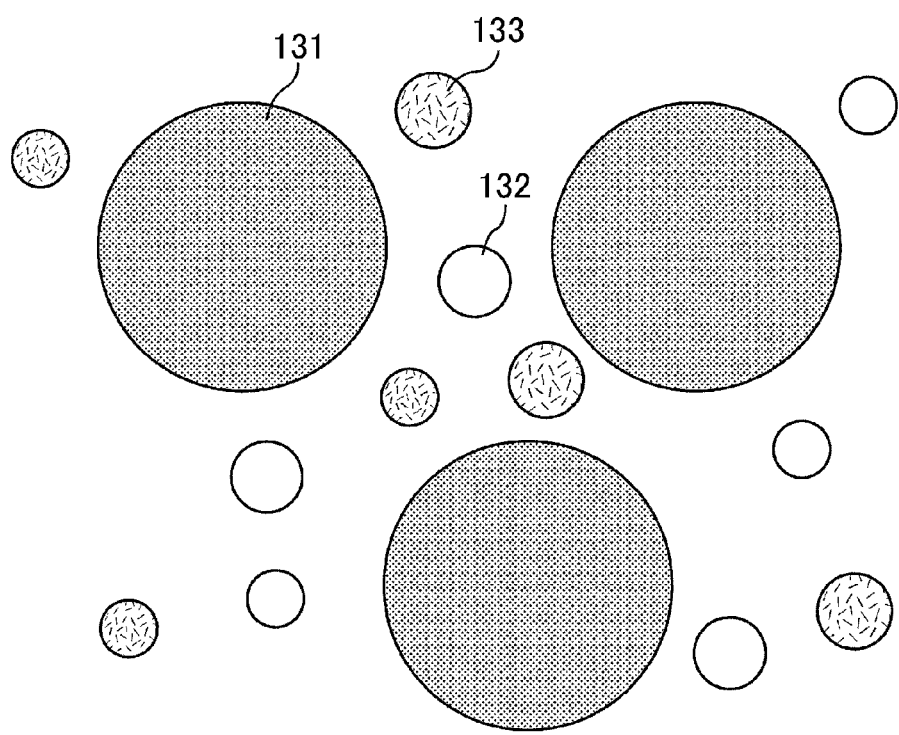
FIG. 13 is a schematic view of a structure in which particles of a fluoropolymer and an adhesive polymer are separated from each other.

Meanwhile, in a powder mixture obtained by, for example, common dry blending of the fluoropolymer particles and the adhesive polymer particles, fluoropolymer particles 131 are separated from adhesive polymer particles 132 and 133 as illustrated in FIG. 13, and thus the adhesive polymer particles may possibly be unevenly distributed in the resulting coating film. As a result, the resulting coating film may not be uniformly adhered to the substrate. Accordingly, a large amount of the adhesive polymer needs to be used to allow the entire surface of the film to adhere firmly to the substrate.

The particulate composite of the present invention is more preferably obtained by bonding particles of the fluoropolymer and particles of the adhesive polymer with a device configured to cause centrifugal diffusion and a vortex. Examples of the device configured to cause centrifugal diffusion and a vortex include attrition mills described later. With the above device, particles of the fluoropolymer and particles of the adhesive polymer can be efficiently bonded. As a result, the coating film formed from the particulate composite more firmly adheres to the substrate. Also, the coating film more uniformly adheres to the substrate.

After the particles are dispersed in water and the resulting dispersion is left to stand for a sufficient amount of time, the particles of the particulate composite of the present invention are preferably floating in the water without making the water cloudy.

The particulate composite of the present invention preferably has an average particle size of 1 to 1000 µm, and more preferably 20 to 500 µm.

Too large an average particle size may not produce a coating film with a smooth surface. Too small an average particle size may decrease the coating efficiency.

The average particle size of the particulate composite can be measured using a laser diffraction/scattering particle size analyzer MT3300 EX II from Nikkiso Co., Ltd.

If the particulate composite of the present invention is used for a coating powder in electrostatic coating, the particulate composite preferably has an average particle size of from 1 µm inclusive to 100 µm exclusive, and more preferably from 20 µm inclusive to 100 µm exclusive.

If the particulate composite is used for a coating powder in rotational lining or rotational molding, the particulate composite preferably has an average particle size of from 100 µm inclusive to 1000 µm inclusive, and more preferably from 100 µm inclusive to 500 µm inclusive.

The particulate composite of the present invention preferably contains the fluoropolymer and the adhesive polymer in a mass ratio (fluoropolymer/adhesive polymer) of 50/50 to 99/1, more preferably 70/30 to 98/2, and still more preferably 80/20 to 98/2.

With a mass ratio of the fluoropolymer to the adhesive polymer within the above range, the adhesion of the coating film formed from the particulate composite of the present invention to the substrate increases, and the coating film more uniformly adheres to the substrate.

In a powder mixture of a fluoropolymer and an adhesive polymer obtained by a conventional method such as dry blending, the fluoropolymer and the adhesive polymer are separated from each other. Accordingly, the resulting coating film may not uniformly adhere to the substrate. Hence, it is necessary to add a large amount of the adhesive polymer to allow the entire surface of the coating film to firmly adhere to the substrate. From the particulate composite of the present invention, a coating film can be obtained which is firmly adhered to a substrate and is also uniformly adhered to the substrate even if containing a small amount of an adhesive polymer as described above.

(Fluoropolymer)

The fluoropolymer is not particularly limited if it is melt-processable. The fluoropolymer preferably has an obvious melting point, and is preferably a fluororesin.

The fluoropolymer preferably has a melting point of 100° C. to 347° C., and more preferably 150° C. to 322° C.

The fluoropolymer is preferably a homopolymer or copolymer having a repeating unit derived from at least one fluorine-containing ethylenic monomer. The fluoropolymer may be prepared by polymerization of a fluorine-containing ethylenic monomer only or by polymerization of a fluorine-containing ethylenic monomer and a fluorine-free ethylenic monomer.

The fluoropolymer preferably has a repeating unit derived from at least one fluorine-containing ethylenic monomer selected from the group consisting of vinyl fluoride [VF], tetrafluoroethylene [TFE], vinylidene fluoride [VdF], chlorotrifluoroethylene [CTFE], hexafluoropropylene [HFP], hexafluoroisobutene, monomers represented by $CH_2=CZ^1(CF_2)_nZ^2$ (in the formula, $Z^1$ represents H or F, $Z^2$ represents H, F, or Cl, and n represents an integer of 1 to 10), perfluoro(alkyl vinyl ether) [PAVE] represented by $CF_2=CF-ORf^1$ (in the formula, $Rf^1$ represents a C1-C8 perfluoroalkyl group), and alkyl perfluorovinyl ether derivatives represented by $CF_2=CF-O-CH_2-Rf^2$ (in the formula, $Rf^2$ represents a C1-C5 perfluoroalkyl group).

The fluoropolymer may have a repeating unit derived from a fluorine-free ethylenic monomer, and may have a repeating unit derived from a C5 or less ethylenic monomer in another preferable embodiment, from the standpoint of maintaining the heat resistance and chemical resistance. Preferably, the fluororesin has at least one fluorine-free ethylenic monomer selected from the group consisting of ethylene, propylene, 1-butene, 2-butene, vinyl chloride, vinylidene chloride, and unsaturated carboxylic acid.

Examples of the fluoropolymer include tetrafluoroethylene-perfluoro(alkyl vinyl ether) copolymers, tetrafluoroethylene-hexafluoropropylene copolymers, tetrafluoroethylene-ethylene copolymers, tetrafluoroethylene-hexafluoropropylene-ethylene copolymers, tetrafluoroethylene-hexafluoropropylene-vinylidenefluoride copolymers, tetrafluoroethylene-perfluoro(alkyl vinyl ether)-chlorotrifluoroethylene copolymers, chlorotrifluoroethylene-ethylene copolymers, polychlorotrifluoroethylene, polyvinylidene fluoride, and polyvinyl fluoride. These fluoropolymers may be used alone or in combination.

The fluoropolymer is preferably at least one selected from the group consisting of polytetrafluoroethylene [PTFE], polychlorotrifluoroethylene [PCTFE], TFE-ethylene [Et] copolymers [ETFE], Et-chlorotrifluoroethylene [CTFE] copolymers, CTFE-TFE copolymers, TFE-HFP copolymers [FEP], TFE-PAVE copolymers [PFA], and polyvinylidene fluoride [PVdF].

Examples of the PAVE include perfluoro(methyl vinyl ether) [PMVE], perfluoro(ethyl vinyl ether) [PEVE], perfluoro(propyl vinyl ether) [PPVE], and perfluoro(butyl vinyl ether). Preferred among these are PMVE, PEVE, and PPVE.

The alkyl perfluoro vinyl ether derivatives are preferably those represented by the above formula in which $Rf^2$ represents a C1-C3 perfluoro alkyl group, and is more preferably $CF_2=CF-O-CH_2-CF_2CF_3$.

The fluoropolymer is more preferably a melt-processable fluororesin, and still more preferably at least one fluororesin selected from the group consisting of PFA, FEP, and ETFE.

The PFA is not particularly limited, and is preferably a copolymer having the TFE unit and PAVE unit in a molar ratio of 70/30 to 99/1 (TFE unit/PAVE unit), and more preferably 80/20 to 98.5/1.5. Too small a number of TFE units tends to lower the mechanical property and too large a number of TFE units tends to excessively increase the melting point to lower the moldability. The PFA is also preferably a copolymer having 0.1 to 10 mol % of the monomer unit derived from monomers copolymerizable with TFE and PAVE and a total of 90 to 99.9 mol % of the TFE unit and PAVE unit. Examples of the monomers copolymerizable with TFE and PAVE include HFP, vinyl monomers represented by $CZ^3Z^4=CZ^5(CF_2)_nZ^6$ (in the formula, $Z^3$, $Z^4$, and $Z^5$ are the same as or different from one another and each represent a hydrogen atom or fluorine atom, $Z^6$ represents a fluorine atom or chlorine atom, and n represents an integer of 2 to 10), and alkyl perfluoro vinyl ether derivatives represented by $CF_2=CF-OCH_2-Rf^7$ (in the formula, $Rf^7$ represents a C1-C5 perfluoroalkyl group).

The FEP is not particularly limited, and is preferably a copolymer having the TFE unit and HFP unit in a molar ratio of 70/30 to 99/1 (TFE unit/HFP unit), and more preferably 80/20 to 97/3. Too small a number of TFE units tends to lower the mechanical property and too large a number of TFE units tends to excessively increase the melting point to lower the moldability. The FEP is also preferably a copolymer having 0.1 to 10 mol % of the monomer unit derived from monomers copolymerizable with TFE and HFP and a total of 90 to 99.9 mol % of the TFE unit and HFP unit. Examples of the monomers copolymerizable with TFE and HFP include PAVE and alkyl perfluoro vinyl ether derivatives.

The ETFE is preferably a copolymer having the TFE unit and ethylene unit in a molar ratio of 20/80 to 90/10 (TFE unit/ethylene unit), more preferably 37/63 to 85/15, and still more preferably 38/62 to 80/20. The ETFE may also be a copolymer of TFE, ethylene, and a monomer copolymerizable with TFE and ethylene. Examples of the copolymerizable monomer include monomers represented by $CH_2=CX^5Rf^3$, $CF_2=CFRf^3$, $CF_2=CFORf^3$, and $CH_2=C(Rf^3)_2$ (in the formula, $X^5$ represents a hydrogen atom or fluorine atom, and $Rf^3$ represents a fluoroalkyl group which may contain an ether-bond oxygen atom). In particular, fluorine-containing vinyl monomers represented by $CF_2=CFRf^3$, $CF_2=CFORf^3$, and $CH_2=CX^5Rf^3$ are preferred. More preferred are HFP, perfluoro(alkyl vinyl ether) [PAVE] represented by $CF_2=CF-ORf^4$ (in the formula, $Rf^4$ represents a C1-C5 perfluoroalkyl group), and fluorine-containing vinyl monomers represented by $CH_2=CX^5Rf^3$ (in the formula, $Rf^3$ represents a C1-C8 fluoroalkyl group). The monomer copolymerizable with TFE and ethylene may also be an aliphatic unsaturated carboxylic acid such as itaconic acid or itaconic anhydride. The amount of the monomer copolymerizable with TFE and ethylene is preferably 0.1 to 10 mol %, more preferably 0.1 to 5 mol %, and particularly preferably 0.2 to 4 mol % of the amount of the fluorine-containing polymer.

The amount of each monomer in the copolymer can be calculated by appropriately combining NMR, FT-IR, elementary analysis, and X-ray fluorescence analysis depending on the monomer species.

The fluoropolymer preferably has an average particle size of 1 µm or larger, and more preferably 20 µm or larger, but preferably of 1000 µm or smaller, and more preferably 500 µm or smaller. Too large an average particle size may not produce a smooth coating film, while too small an average particle size may decrease the coating efficiency.

The fluoropolymer preferably has a bulk density of 0.40 or higher, more preferably 0.50 or higher, and still more preferably 0.60 or higher, but preferably of 1.40 or lower, and more preferably 1.30 or lower. With a bulk density in the above range, a smooth coating film can be obtained.

The above bulk density can be measured in accordance with JIS K 6891.

Emulsion polymerization and suspension polymerization have been mainly commercialized as the methods for producing the fluoropolymer. In the case of production of a fluoropolymer by emulsion polymerization, the resulting fluoropolymer is in the form of a dispersion in which fine particles of the fluoropolymer are dispersed in water. There is a concern that powder particles obtained from the dispersion by spray drying or coagulation can cause accumulation, in ecosystem, of a fluorosurfactant used in the polymerization. Also, since a coating film formed from the powder particles contains the fluorosurfactant, the inherent features of a fluororesin coating film may not be satisfactorily achieved. Here, the fluorosurfactant can be volatile-degraded to deteriorate the adhesion of the coating film to a substrate.

Hence, the particulate composite of the present invention preferably contains a fluoropolymer obtained from a suspension polymerization product. In this case, a fluoropolymer can be produced without a fluorosurfactant. Accordingly, the coating film formed from the particulate composite of the present invention is free from fluorosurfactants, has a low environmental impact, and can exhibit the inherent features of a fluororesin coating film. Also, deterioration in the adhesion of such a coating film to the substrate, which can be caused by volatile decomposition of the residual fluorosurfactant, does not occur.

In the present invention, a fluoropolymer formed by suspension polymerization is preferably used. Since a fluorosurfactant is not used in suspension polymerization, a fluoropolymer formed by suspension polymerization can give a particulate composite containing less than 0.1 ppm of a fluorosurfactant.

(Adhesive Polymer)

The particulate composite of the present invention contains a fluoropolymer and an adhesive polymer. The particulate composite of the present invention containing an adhesive polymer can form a coating film with excellent adhesion to a substrate.

The adhesive polymer is preferably at least one compound selected from the group consisting of polyimide [PI], polyamide-imide [PAI], polyamide [PA], polyamide acid (polyamic acids), epoxy resin, polysulfide, polyarylene sulfide [PAS], and polyether sulfone [PES].

The PAI, PA, and polyamide acid are polymers each of which typically has amide groups (—NH—C(=O)—) in its main chain or side chains, and has aromatic rings in its main chain.

The PAI is a polycondensate containing amide groups, aromatic rings, and imide groups. The PAI is not particularly limited, and may be a known PAI or may be a PAI obtained by generating amide groups in a polyimide (PI) through oxidation, for example.

The polyamide is a polycondensate having amide bonds (—NH—C(=O)—) in its main chain. Examples of the polyamide include, but not particularly limited to, aliphatic polyamides such as Nylon 6, Nylon 66, Nylon 11, and Nylon 12; and aromatic polyamides such as polyparaphenylene terephthalamide and polymetaphenylene isophthalamide.

The polyamide acid is a polycondensate containing amide groups, and carboxy groups or derivatives of carboxy groups (e.g. derivatives of alkyl-esterified carboxy groups). Examples of the polyamide acid include, but not particularly limited to, polyamide acid having a molecular weight of several thousands to tens of thousands.

The polyimide is to be converted into a PAI or a polyamide acid through oxidation.

In the case of using the particulate composite of the present invention for a coating powder, baking the coating powder applied at high temperatures for a long time causes oxidation in the polyimide to generate amide groups in the main chain, thereby converting the polyimide into a PAI or a polyamide acid. The PAI may be any PAI obtained by forming amide groups from part of imide groups in the main chain of a PI. The polyamide acid is obtained by forming amide groups and carboxy groups from all the imide groups in the main chain of a PI.

The method for generating amide groups in a PI is not particularly limited. Examples of the method include oxidative ring-opening of imide groups (imide rings) in a PI, and alkali hydrolysis of imide groups (imide rings) in a PI.

The epoxy resin is preferably an epoxy resin having a bisphenol A unit.

Examples of the PAS include, but not particularly limited to, polyphenylene sulfide ketone, polyphenylene sulfide sulfone, polybiphenylene sulfide, and polyphenylene sulfide [PPS]. Preferred among these is PPS. If it is preferred to avoid use of amine or elution of a metal ion as in the case of processes such as semiconductor manufacture, then a PAS is preferred. Also if heat-resistant adhesion is required, a PAS is suitable for use for provision of not only antioxidation but also heat-resistant adhesion because PAS also serves as a heat-resistant binder.

The adhesive polymers may be used alone or in combination.

The adhesive polymer preferably has an average particle size that is 1 to 50%, more preferably 2 to 20%, of the average particle size of the fluoropolymer. If the average particle size of the adhesive polymer is sufficiently smaller than the average particle size of the fluoropolymer, then the fluororesin particles presumably cover the adhesive polymer, and thus sufficient adhesion can be achieved even if the proportion of the fluoropolymer is high.

The adhesive polymer may be commercially available powder, or fine powder obtained by further pulverizing the powder. Otherwise, the adhesive polymer may be powder obtained by pulverizing commercially available pellets of an adhesive polymer. The pulverizing method is not particularly limited, and can be common pulverization with a pulverizer or atomizer, for example.

The adhesive polymer preferably contains at least one polymer compound (A) selected from the group consisting of polyimides [PI], polyamide-imides [PAI], polyamides [PA], polyamide acids (polyamic acids), and epoxy resins, together with at least one sulfur-containing compound (B) selected from the group consisting of polysulfide, polyarylene sulfide [PAS], and polyether sulfone [PES]. Combination use of the polymer compound (A) and the sulfur-containing compound (B) as described above further increases the adhesion of the coating film to the substrate.

The upper limit for the average particle size of the polymer compound (A) is preferably 200 μm, and more preferably 150 μm. If the average particle size of the polymer compound (A) is in the above range, the lower limit for the average particle size can preferably be 0.01 μm, more preferably 0.1 μm. The average particle size of the polymer compound (A) is preferably smaller than the average particle size of the fluoropolymer, more preferably smaller than 100 μm, and still more preferably 50 μm or smaller.

The upper limit for the average particle size of the sulfur-containing compound (B) is preferably 200 μm, and more preferably 150 μm. If the average particle size of the sulfur-containing compound (B) is in the above range, the lower limit for the average particle size can preferably be 0.01 μm, and more preferably 0.1 μm. The average particle size of the sulfur-containing compound (B) is preferably smaller than the average particle size of the fluoropolymer, and is more preferably 20 μm or smaller.

The method for producing a particulate composite according to the present invention is a method for producing the above particulate composite, and includes the steps of: placing a fluoropolymer and an adhesive polymer in a surface treating device; mixing the fluoropolymer and the adhesive polymer in the surface treating device to obtain a particulate composite; and collecting the particulate composite from the surface treating device.

The surface treating device usable for production of the particulate composite of the present invention is described. The surface treating device is preferably a high-speed fluidizing mixer, a high-speed rotary impact crusher, or an attrition mill. The above surface treating device enables highly efficient production of the particulate composite capable of forming a coating film that has adhesion to a substrate and uniformly adheres to the substrate.

Such a surface treating device for performing a dry process, not a wet process, facilitates the production operation, and enables production of the particulate composite of the present invention in which the fluoropolymer particles and the adhesive polymer particles are bonded to each other. Also, the device enables production of a particulate composite of which the particles are floating in the water without making the water cloudy after the particles are dispersed in water and the resulting dispersion is left to stand for a sufficient amount of time.

For example, in the case that the fluoropolymer and the adhesive polymer are mixed by common dry blending, the fluoropolymer and the adhesive polymer may not be bonded to each other. The mixture, when applied, may have different blending ratios between the fluoropolymer and the adhesive polymer at different points, leading to non-uniform adhesion of the resulting coating film. To deal with such a case, an excessive amount of the adhesive polymer needs to be used.

Also, in the case of isolating, by water treatment, the powder mixture of the fluoropolymer and the adhesive resin obtained by co-coagulation from an aqueous dispersion of the fluoropolymer and the adhesive resin, the resulting powder mixture forms a coating film that has insufficient, non-uniform adhesion to a substrate. Furthermore, since the resins are compounded in the dispersion in this case, commercially carrying out this process requires large machines such as a dryer and cannot avoid coagulation during drying. Hence, the productivity is not always high.

The various surface treating devices mentioned above are described below.

1. High-speed Fluidizing Mixer

This is a device having the axis of rotation in the perpendicular direction and a guide plate in a drum, and two blades are provided at the bottom of the axis of rotation. Rotating the axis of rotation at a high speed allows the lower blade to flow the powder upwardly and allows the upper blade to apply large mechanical stress to the powder. In addition, the powder strikes the guide plate and the inner wall of the device at a high speed, and thus receives a great impact. The treatment is preferably performed with the temperature of the fluoropolymer powder in the range of 100° C. to 200° C.

2. High-speed Rotary Impact Crusher

This is a device having a rotational disc configured to rotate in a drum, and a circulation path that connects the center portion of the drum and the inner wall portion of the drum. The powder supplied by airflow receives impact when striking the impact pins arranged on the rotational disc and the inner wall of the device. Once discharged out of the drum through the circulation path, the powder is flown back to the drum, so that mechanical stress is repeatedly applied to the powder. The treatment is preferably performed with the temperature of the fluoropolymer powder in the range of 50° C. to 200° C.

3. Attrition Mill

This is a device having multiple blades in the outer periphery portion of the axis of rotation in a drum, and rotates the blades to cause centrifugal diffusion and a vortex, allowing the powder to flow in the drum. The powder receives mechanical stress by being rubbed against the inner wall of the device. Here, a stirring member may be driven which is configured to make the powder flow back and forth in the direction of the axis of rotation. The treatment is preferably performed with the temperature of the fluoropolymer powder in the range of 50° C. to 200° C.

Preferred among these surface treating devices is the attrition mill enabling production of a coating film that has comparatively high adhesion to a substrate and comparatively uniformly adheres to the substrate.

Preferred among attrition mills is a mill having the following structure: a rotating body equipped with a plurality of blades in the periphery thereof, and a casing equipped with a cylindrical inner peripheral surface close to the radial ends of the blades. The blades, adjacent to each other in the axial direction of the rotating body, are extended from the axial center in directions different from each other. Also, blades of at least a pair of the blades adjacent to each other along the axial center are inversely inclined to each other with respect to the axial center. Examples of such a device include the device described in JP 2010-180099 A.

In a device having such a structure, large compressive force and shearing force are applied between the radial ends of the blades and the inner peripheral surface of the casing. The forces are considered to enable production of a particulate composite in which a fluoropolymer and an adhesive resin are more firmly bonded to each other, and thereby enable the composite to form a coating film that has high adhesion to a substrate and more uniformly adheres to the substrate.

Examples of the device include Nobilta from Hosokawa Micron Corporation.

The powder supplied to these devices may be crude powder obtained by suspension polymerization, or powder obtained by pulverizing the densified crude powder with a roll or another tool. Also, different fluoropolymers may be mixed, and the mixture may be supplied to the treating device. Additives may be mixed into the fluoropolymer if the inherent features of the fluoropolymer are not deteriorated, and the mixture may be supplied to the treating device. For example, PFA can be mixed with less than 1% by weight of PTFE. A metal compound containing a metal such as copper, zinc, or cobalt can be mixed with less than 1% by weight of the PFA or ETFE.

The method for producing the particulate composite of the present invention may include the step of producing a fluoropolymer by polymerizing a fluorine-containing ethylenic monomer by suspension polymerization.

If desired, the method for producing the particulate composite of the present invention may also include the step of pulverizing the fluoropolymer.

In the method for producing the particulate composite of the present invention, the particle size distribution of the fluoropolymer powder may be narrowed by classification, for increase in the handleability of the fluoropolymer powder.

The coating powder of the present invention contains the above particulate composite. Since the coating powder of the present invention contains the above particulate composite, the coating powder can form a coating film that has high adhesion to a substrate and is uniformly adhered to the substrate.

The coating powder of the present invention may further contain additives commonly added to a coating powder. Examples of the additives include leveling agents, solid lubricants, pigments, radiant materials, fillers, pigment dispersants, anti-settling agents, water absorbers, surface control agents, thixotropic agents, viscosity modifiers, anti-gelling agents, ultraviolet absorbers, light stabilizers, plasticizers, anti-color separating, anti-skinning agents, scratch resistance agents, antifungal agents, antibacterial agents, corrosion inhibitors, antistatic agents, and silane coupling agents.

The coating film of the present invention is also formed from the above coating powder. Since the coating film of the present invention is formed from the coating powder containing the above particulate composite, the coating film has high adhesion to a substrate, and is uniformly adhered to the substrate. Also, since the coating film is free from fluorosurfactants, the coating film exhibits a low environmental impact and the inherent features of fluoropolymers, such as non-stickiness.

The coating film of the present invention can be formed by coating a substrate with the coating powder containing the particulate composite. Examples of the coating method include electrostatic coating, rotational lining, and rotational molding.

The electrostatic coating includes discharging an electrically charged particulate composite from the tip of a coating gun onto a substrate, and baking the discharged particulate composite to form a coating film. In this case, the average particle size of the fluoropolymer included in the particulate composite is preferably from 1 μm inclusive to 100 μm exclusive, and more preferably from 20 μm inclusive to 100 μm exclusive.

The rotational lining and rotational molding each include placing a particulate composite into a hollow metal mold, and rotating the mold in an oven to form a film on the inner wall of the mold. In this case, the average particle size of the fluoropolymer included in the particulate composite is preferably from 100 μm inclusive to 1000 μm inclusive, and more preferably from 100 μm inclusive to 500 μm inclusive.

The thickness of the coating film of the present invention is not particularly limited, and may be determined for each use. The thickness may be, for example, 20 μm to 1000 μm.

The laminate of the present invention is a laminate including the above coating film on a metal substrate. Since the coating film in the laminate of the present invention is the above coating film, the coating film has high adhesion to a metal substrate, and is uniformly adhered to the metal substrate. Also, since the laminate is free from fluorosurfactants, the laminate exhibits a low environmental impact and the inherent features of fluoropolymers, such as non-stickiness.

The metal substrate may be formed from, for example, a metal such as iron, stainless steel, or aluminum. The shape of the metal substrate is appropriately determined for the use of the laminate.

The coating film of the laminate of the present invention has an adhesion strength to a metal substrate of 50 to 300 N/cm, preferably 60 to 300 N/cm, more preferably 70 to 300 N/cm, still more preferably 80 to 300 N/cm, and particularly preferably 90 to 300 N/cm.

The adhesion strength here is a peel strength determined by coating a metal substrate with a coating powder containing the particulate composite by electrostatic coating, cutting the obtained coating film to reach the metal surface at 10-mm intervals, and pulling the coating film in the direction 90° from the specimen at a pulling rate of 50 mm/min using a Tensilon universal testing machine in accordance with K 6854-1 (1999). The metal substrate here can be iron.

The laminate of the present invention preferably has a standard deviation of the adhesion strength between the coating film and the metal substrate of less than 10. A smaller standard deviation of the adhesion strength indicates more uniform adhesion between the coating film and the metal substrate in the laminate of the present invention.

The standard deviation of adhesive strength is calculated from the following formula.

$$\text{Standard deviation} = \sqrt{\frac{(S_1 - m)^2 + (S_2 - m)^2 + (S_3 - m)^2 + \ldots + (S_i - m)^2}{i}} \quad [\text{Math 1}]$$

In the formula, $S_1$ to $S_i$ are the respective adhesion strengths of the samples (specimens), where i represents the number of the samples;

m is the average of adhesion strengths; and m is calculated from the following formula.

$$m = (S_1 + S_2 + S_3 + \ldots + S_i)/i$$

The particulate composite, coating powder, coating film, and laminate of the present invention can be used for various uses, such as kitchen utensils (e.g. frying pans), household appliances (e.g. rice cookers), belts and rolls used for OA devices (e.g. printers, copy machines), and corrosion-resistant linings for pipes and tanks.

EXAMPLES

The present invention is described below in more detail based on examples which, however, are not intended to limit the scope of the present invention.

Evaluation in examples and comparative examples was carried out as follows.
Average Particle Size (Particle Size Distribution)
The average particle size was determined using a laser diffraction/scattering particle size analyzer MT3300 EX II from Nikkiso Co., Ltd.
Fluorosurfactant Concentration
The fluorosurfactant contained in the particulate composite was extracted in acetone by Soxhlet extraction, and the concentration of the fluorosurfactant was measured with a mass spectrometer Quattro micro GC from Nihon Waters K.K.
Thickness of Coating Film
The thickness of the coating film formed by electrostatic coating was measured with the electro-magnetic coating thickness meter SWT-8100 from SANKO ELECTRONIC LABORATORY CO., LTD.
Adhesion Between Coating Film and Metal Substrate
The peel strength was determined by cutting the coating film obtained in an example or comparative example to reach the metal surface at 10-mm intervals, and pulling the coating film in the direction 90° from the specimen at a pulling rate of 50 mm/min by a Tensilon universal testing machine in accordance with K 6854-1 (1999).
Standard Deviation of Adhesion Strength Between Coating Film and Substrate
The standard deviation of the adhesion strength was calculated from the following formula.

$$\text{Standard deviation} = \sqrt{\frac{(S_1 - m)^2 + (S_2 - m)^2 + (S_3 - m)^2 + \ldots + (S_i - m)^2}{i}} \quad [\text{Math 2}]$$

In the formula, $S_1$ to $S_i$ are the respective adhesion strengths of the samples (specimens), where i represents the number of the samples;

m is the average of adhesion strengths; and m is calculated from the following formula.

$$m = (S_1 + S_2 + S_3 + \ldots + S_i)/i$$

Underwater Separation Test

The particulate composite (0.5 g) was added to pure water (5 g), and the mixture was shaken. The mixture was left to stand for a while, and then the turbidity of the water was determined.

O: Separation did not occur.

x: Separation occurred.

Surface Treating Device

Theta composer from TOKUJU CO., LTD. (treating device (I))

Hybridization system from Nara Machinery Co., Ltd. (treating device (II))

Nobilta from Hosokawa Micron Corporation (treating device (III))

Example 1

A tetrafluoroethylene-perfluoro(alkyl vinyl ether) copolymer [PFA] (absolute specific gravity: 2.15, melting point: 304° C., molar ratio of TFE/PAVE: 98/2) obtained by suspension polymerization was compressed with the roller compactor BSC-25 from Sintokogio, Ltd. such that the resulting sheet would have an absolute gravity of 90% or higher of the copolymer. Thereby, a sheet having a width of 60 mm and a thickness of 5 mm was obtained. The sheet was then broken into about 10-mm-size pieces with a cracking machine provided to the roller compactor, and the pieces were pulverized with the pulverizer Cosmomizer N-1 from Nara Machinery Co., Ltd. The pulverized PFA (average particle size: 23 μm), a polyamide-imide resin (trade name: Torlon 4000 TF, Solvay Advanced Polymers, average particle size: 2 μm), and a polyphenylene sulfide resin (trade name: Ryton V-1, Chevron Phillips Chemical Company, average particle size: 5 μm) were treated with the theta composer from TOKUJU CO., LTD. Thereby, powder of a particulate composite of a PFA, the polyamide-imide resin, and the polyphenylene sulfide resin was obtained. The concentration of the fluorosurfactant in the obtained powder was calculated. Also, the obtained particulate composite was subjected to an underwater separation test.

Furthermore, using the obtained powder, a coating film was formed on an iron substrate by electrostatic coating under the following conditions, and the thickness of the coating film, adhesion between the coating film and the substrate, and standard deviation of the adhesion strength between the coating film and the substrate were determined. The evaluation results are shown in Table 1.

Example 2

Powder of a particulate composite was produced by the same method as in Example 1 except that the hybridization system from Nara Machinery Co., Ltd. was used instead of the theta composer from TOKUJU CO., LTD. In the same manner as in Example 1, a coating film was formed, and the evaluations were performed. The evaluation results are shown in Table 1.

Example 3

Powder of a particulate composite was produced by the same method as in Example 1 except that the Nobilta from Hosokawa Micron Corporation was used instead of the theta composer from TOKUJU CO., LTD. in Example 1. In the same manner as in Example 1, a coating film was formed, and the evaluations were performed. The evaluation results are shown in Table 1.

Example 4

Powder of a particulate composite was produced by the same method as in Example 1 except that the compounding ratio of the PFA, the polyamide-imide resin, and the polyphenylene sulfide resin was changed to the ratio shown in Table 1. In the same manner as in Example 1, a coating film was formed, and the evaluations were performed. The evaluation results are shown in Table 1.

A scanning electron microscope (SEM) photograph of the particulate composite obtained is shown in FIG. 1.

Example 5

Powder of a particulate composite was produced by the same method as in Example 2 except that the compounding ratio of the PFA, the polyamide-imide resin, and the polyphenylene sulfide resin was changed to the ratio shown in Table 1. In the same manner as in Example 2, a coating film was formed, and the evaluations were performed. The evaluation results are shown in Table 1.

Figure 2:
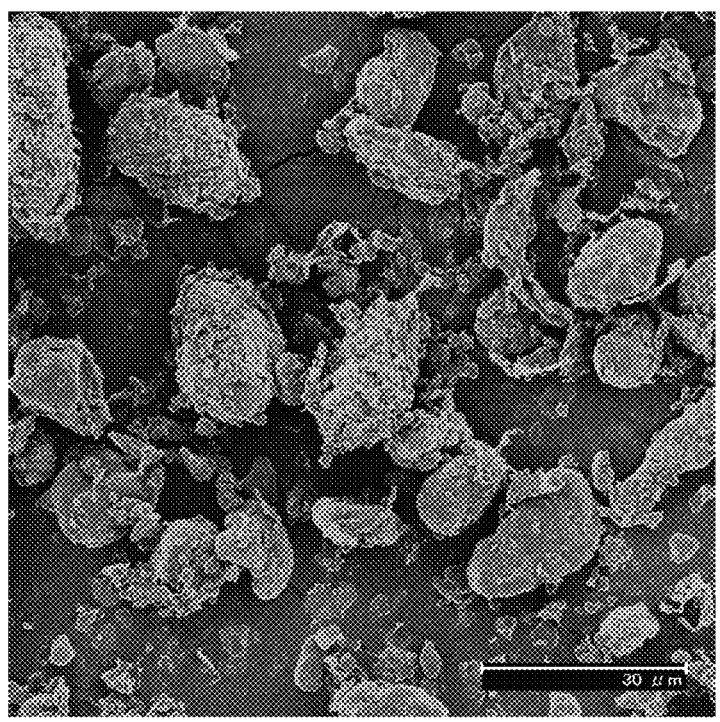
FIG. 2 is a scanning electron microscope photograph of the surface of a particulate composite obtained in Example 5.
Figure 7:
FIG. 7 is a photograph taken after an underwater separation test for the particulate composite obtained in Example 5.

A scanning electron microscope (SEM) photograph of the particulate composite obtained is shown in FIG. 2. A photograph taken after the underwater separation test is shown in FIG. 7.

Example 6

Powder of a particulate composite was produced by the same method as in Example 3 except that the compounding ratio of the PFA, the polyamide-imide resin, and the polyphenylene sulfide resin was changed to the ratio shown in Table 1. In the same manner as in Example 3, a coating film was formed, and the evaluations were performed. The evaluation results are shown in Table 1.

Figure 3:
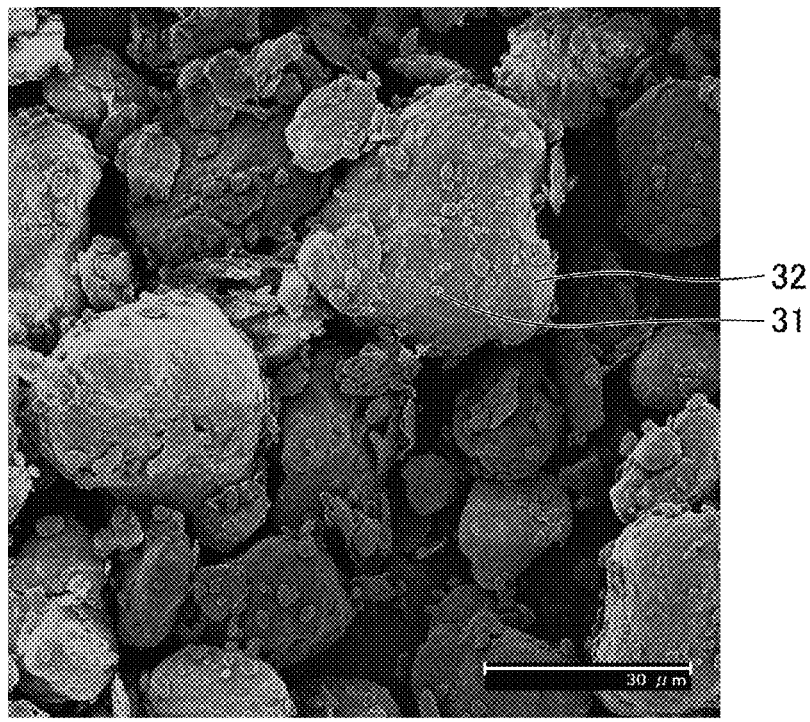
FIG. 3 is a scanning electron microscope photograph of the surface of a particulate composite obtained in Example 6.
Figure 8:
FIG. 8 is a photograph taken after an underwater separation test for the particulate composite obtained in Example 6.

A scanning electron microscope (SEM) photograph of the particulate composite obtained is shown in FIG. 3. The electrification amount measured in the observation was −7.00 μc/g. A photograph taken after the underwater separation test is shown in FIG. 8.

Example 7

Powder of a particulate composite was produced by the same method as in Example 3 except that the average particle size of the pulverized PFA was changed to 132 μm, and the compounding ratio of the PFA, the polyamide-imide resin, and the polyphenylene sulfide resin was changed to the ratio shown in Table 1. In the same manner as in Example 3, a coating film was formed, and the evaluations were performed. The evaluation results are shown in Table 1.

Example 8

Powder of a particulate composite was produced by the same method as in Example 7 except that a tetrafluoroethylene-hexafluoropropylene copolymer [FEP] (absolute specific gravity: 2.15, melting point: 269° C., molar ratio of TFE/HFP: 90/10) was used instead of the tetrafluoroethylene-perfluoroalkyl vinyl ether copolymer [PFA]. The average particle size of pulverized FEP was 35 μm.

In the same manner as in Example 7, a coating film was formed, and the evaluations were performed. The evaluation results are shown in Table 1.

Example 9

Powder of a particulate composite was produced by the same method as in Example 1 except that a tetrafluoroethylene-ethylene copolymer [ETFE] (absolute specific gravity: 1.85, melting point: 254° C., molar ratio: TFE/ethylene/(perfluorobutyl)ethylene: 56/42/2) was used instead of the tetrafluoroethylene-perfluoroalkyl vinyl ether copolymer [PFA]. The average particle size of pulverized ETFE was 43 μm.

In the same manner as in Example 1, a coating film was formed, and the evaluations were performed. The evaluation results are shown in Table 1.

Example 10

Powder of a particulate composite was produced by the same method as in Example 9 except that the hybridization system from Nara Machinery Co., Ltd. was used instead of the theta composer from TOKUJU CO., LTD. In the same manner as in Example 9, a coating film was formed, and the evaluations were performed. The evaluation results are shown in Table 1.

Example 11

Powder of a particulate composite was produced by the same method as in Example 9 except that the Nobilta from Hosokawa Micron Corporation was used instead of the theta composer from TOKUJU CO., LTD. In the same manner as in Example 9, a coating film was formed, and the evaluations were performed. The evaluation results are shown in Table 1.

Example 12

Powder of a particulate composite was produced by the same method as in Example 9 except that the compounding ratio of the ETFE, the polyamide-imide resin, and the polyphenylene sulfide resin was changed to the ratio shown in Table 1. In the same manner as in Example 9, a coating film was formed, and the evaluations were performed. The evaluation results are shown in Table 1.

Example 13

Powder of a particulate composite was produced by the same method as in Example 10 except that the compounding ratio of the ETFE, the polyamide-imide resin, and the polyphenylene sulfide resin was changed to the ratio shown in Table 1. In the same manner as in Example 10, a coating film was formed, and the evaluations were performed. The evaluation results are shown in Table 1.

Example 14

Powder of a particulate composite was produced by the same method as in Example 11 except that the compounding ratio of the ETFE, the polyamide-imide resin, and the polyphenylene sulfide resin was changed to the ratio shown in Table 1. In the same manner as in Example 11, a coating film was formed, and the evaluations were performed. The evaluation results are shown in Table 1.

Figure 4:
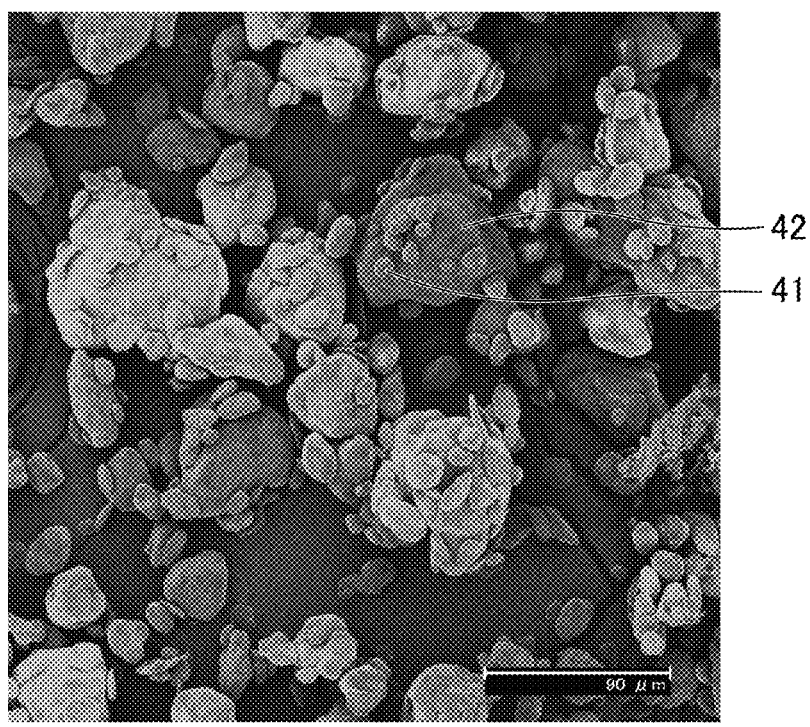
FIG. 4 is a scanning electron microscope photograph of the surface of a particulate composite obtained in Example 14.
Figure 9:
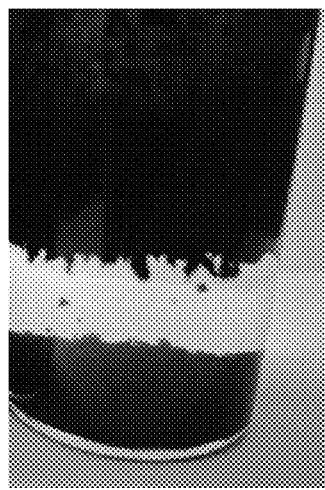
FIG. 9 is a photograph taken after an underwater separation test for the particulate composite obtained in Example 14.

A scanning electron microscope (SEM) photograph of the particulate composite obtained is shown in FIG. 4. The electrification amount measured in the observation was −5.82 μc/g. A photograph taken after the underwater separation test is shown in FIG. 9.

Example 15

Powder of a particulate composite was produced by the same method as in Example 11 except that the average particle size of the pulverized ETFE was changed to 254 μm, and the compounding ratio of the ETFE, the polyamide-imide resin, and the polyphenylene sulfide resin was changed to the ratio shown in Table 1. In the same manner as in Example 11, a coating film was formed, and the evaluations were performed. The evaluation results are shown in Table 1.

Comparative Example 1 (Dry Blending)

A tetrafluoroethylene-perfluoroalkyl vinyl ether copolymer (absolute specific gravity: 2.15, melting point: 304° C., molar ratio of TFE/PAVE: 98/2, average particle size: 23 μm) obtained by suspension polymerization, a resin (trade name: Torlon 4000 TF, Solvay Advanced Polymers), and a polyphenylene sulfide resin (trade name: Ryton V-1, Chevron Phillips Chemical Company) were uniformly dispersed with a mixer (V Blender, Dalton Co., Ltd.). Thereby, a powder mixture having the compounding ratio shown in Table 1 was obtained. The concentration of the fluorosurfactant in the obtained powder was calculated. The obtained powder was subjected to the underwater separation test.

Furthermore, using the obtained powder, a coating film was formed on an iron substrate by electrostatic coating, and the thickness of the coating film, adhesion between the coating film and the substrate, and standard deviation of the adhesion strength between the coating film and the substrate were determined. The evaluation results are shown in Table 1.

Comparative Example 2 (Spray Drying)

A tetrafluoroethylene-perfluoroalkyl vinyl ether copolymer (absolute specific gravity: 2.15, melting point: 304° C., molar ratio of TFE/PAVE: 98/2) obtained by emulsion polymerization, a liquefied polyamide-imide resin (trade name: HI-680, Hitachi Chemical Co., Ltd.), and a polyphenylene sulfide resin (trade name: Ryton V-1, Chevron Phillips Chemical Company) were treated with a mini spray dryer B-290 from Nihon BUCHI K.K. Thereby, a powder mixture having the compounding ratio shown in Table 1 was obtained. The concentration of the fluorosurfactant in the obtained powder was calculated. The obtained powder was subjected to the underwater separation test.

Furthermore, using the obtained powder, a coating film was formed on an iron substrate by electrostatic coating, and the thickness of the coating film, adhesion between the coating film and the substrate, and standard deviation of the adhesion strength between the coating film and the substrate were determined. The evaluation results are shown in Table 1.

Comparative Example 3 (Dry Blending)

A powder mixture having the compounding ratio shown in Table 1 was obtained by the same manner as in Comparative Example 1 except that the compounding ratio of the PFA, the polyamide-imide resin, and the polyphenylene sulfide resin was changed to the ratio shown in Table 1. In the same manner as in Comparative Example 1, a coating film was formed, and the evaluations were performed. The evaluation results are shown in Table 1.

Figure 5:
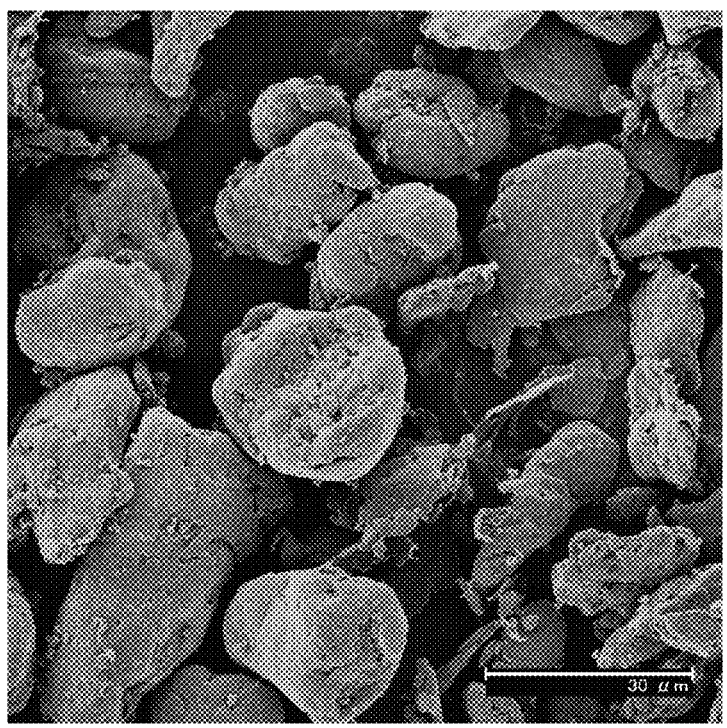
FIG. 5 is a scanning electron microscope photograph of the surface of a powder mixture obtained in Comparative Example 3.
Figure 10:
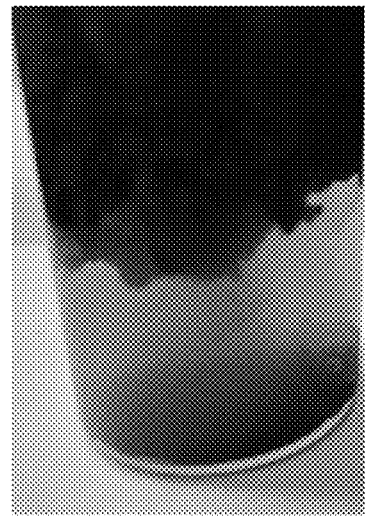
FIG. 10 is a photograph taken after an underwater separation test for the powder mixture obtained in Comparative Example 3.

A scanning electron microscope (SEM) photograph of the powder mixture obtained is shown in FIG. 5. The electrification amount measured in the observation was −9.10 μc/g. A photograph taken after the underwater separation test is shown in FIG. 10.

Comparative Example 4 (Co-coagulation)

A tetrafluoroethylene-perfluoroalkyl vinyl ether copolymer (absolute specific gravity: 2.15, melting point: 304° C., molar ratio of TFE/PAVE: 98/2) obtained by emulsion polymerization, a liquefied polyamide imide resin (trade name: HI-680, Hitachi Chemical Co., Ltd.), and a polyphenylene sulfide resin (trade name: Ryton V-1, Chevron Phillips Chemical Company) were co-coagulated, dried, and then crushed with a cooking mixer. Thereby, a powder mixture having the compounding ratio shown in Table 1 was obtained. The concentration of the fluorosurfactant in the obtained powder was calculated. The obtained powder was subjected to the underwater separation test.

In the same manner as in Comparative Example 1, a coating film was formed, and the evaluations were performed. The evaluation results are shown in Table 1.

Comparative Example 5 (Dry Blending)

A powder mixture having the compounding ratio shown in Table 1 was produced in the same manner as in Comparative Example 1 except that a tetrafluoroethylene-ethylene copolymer [ETFE] (absolute specific gravity: 1.85, melting point: 254° C., molar ratio of TFE/ethylene/(perfluorobutyl)ethylene: 56/42/2) was used instead of the tetrafluoroethylene-perfluoroalkyl vinyl ether copolymer [PFA]. The average particle size of the ETFE was 43 µm. In the same manner as in Comparative Example 1, a coating film was formed, and the evaluations were performed. The evaluation results are shown in Table 1.

Figure 6:
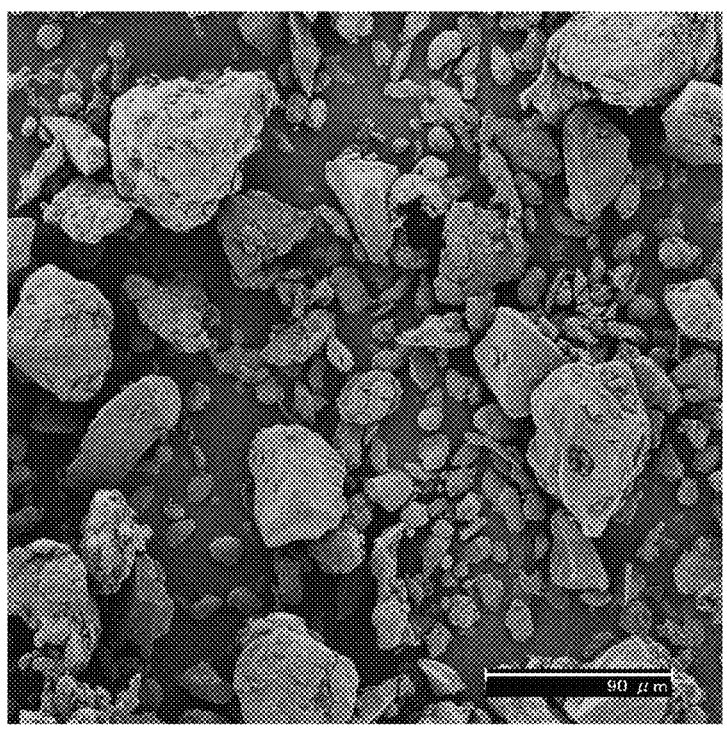
FIG. 6 is a scanning electron microscope photograph of the surface of a powder mixture obtained in Comparative Example 5.
Figure 11:
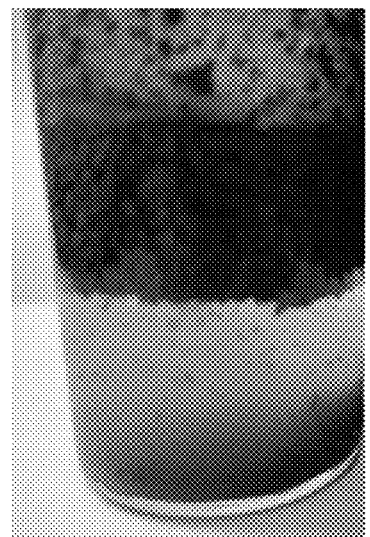
FIG. 11 is a photograph taken after an underwater separation test for the powder mixture obtained in Comparative Example 5.

A scanning electron microscope (SEM) photograph of the powder obtained is shown in FIG. 6. The electrification amount measured in the observation was −17.82 µc/g. A photograph taken after the underwater separation test is shown in FIG. 11.

Comparative Example 6 (Dry Blending)

A powder mixture having the compounding ratio shown in Table 1 was produced in the same manner as in Comparative Example 1 except that a tetrafluoroethylene-hexafluoropropylene copolymer [FEP] (absolute specific gravity: 2.15, melting point: 269° C., molar ratio of TFE/HFP: 90/10) was used instead of the tetrafluoroethylene-perfluoroalkyl vinyl ether copolymer [PFA]. The average particle size of the FEP was 35 µm. In the same manner as in Comparative Example 1, a coating film was formed, and the evaluations were performed. The evaluation results are shown in Table 1.

TABLE 1

| | Fluoropolymer | Polymerization method | Fluorosurfactant concentration (ppm) | Compounding ratio by weight Fluororesin/PAI/PPS | Treating method |
|---|---|---|---|---|---|
| Example 1 | PFA | Suspension | <0.1 ppm | 9:0.6:0.4 | Treating device (I) |
| Example 2 | PFA | Suspension | <0.1 ppm | 9:0.6:0.4 | Treating device (II) |
| Example 3 | PFA | Suspension | <0.1 ppm | 9:0.6:0.4 | Treating device (III) |
| Example 4 | PFA | Suspension | <0.1 ppm | 8:1.2:0.8 | Treating device (I) |
| Example 5 | PFA | Suspension | <0.1 ppm | 8:1.2:0.8 | Treating device (II) |
| Example 6 | PFA | Suspension | <0.1 ppm | 8:1.2:0.8 | Treating device (III) |
| Example 7 | PFA | Suspension | <0.1 ppm | 8:1.2:0.8 | Treating device (III) |
| Example 8 | FEP | Suspension | <0.1 ppm | 8:1.2:0.8 | Treating device (III) |
| Example 9 | ETFE | Suspension | <0.1 ppm | 9:1:0 | Treating device (I) |
| Example 10 | ETFE | Suspension | <0.1 ppm | 9:1:0 | Treating device (II) |
| Example 11 | ETFE | Suspension | <0.1 ppm | 9:1:0 | Treating device (III) |
| Example 12 | ETFE | Suspension | <0.1 ppm | 7:3:0 | Treating device (I) |
| Example 13 | ETFE | Suspension | <0.1 ppm | 7:3:0 | Treating device (II) |
| Example 14 | ETFE | Suspension | <0.1 ppm | 7:3:0 | Treating device (III) |
| Example 15 | ETFE | Suspension | <0.1 ppm | 7:3:0 | Treating device (III) |
| Comparative Example 1 | PFA | Suspension | <0.1 ppm | 9:0.6:0.4 | Dry blending |
| Comparative Example 2 | PFA | Emulsion | 0.1 | 8:1.2:0.8 | Spray drying |
| Comparative Example 3 | PFA | Suspension | <0.1 ppm | 8:1.2:0.8 | Dry blending |
| Comparative Example 4 | PFA | Emulsion | 0.1 | 8:1.2:0.8 | Co-coagulation |
| Comparative Example 5 | ETFE | Suspension | <0.1 ppm | 7:3:0 | Dry blending |
| Comparative Example 6 | FEP | Suspension | <0.1 ppm | 8:1.2:0.8 | Dry blending |

| | Average particle size of particulate composite (µm) | Underwater separation test Separation did not occur: o Separation occurred: x | Film thickness (µm) | Adhesion (N/cm) | Standard deviation |
|---|---|---|---|---|---|
| Example 1 | 23 | o | 70 | 81 | 3.43 |
| Example 2 | 23 | o | 68 | 79 | 2.56 |
| Example 3 | 23 | o | 71 | 92 | 1.19 |
| Example 4 | 23 | o | 65 | 80 | 3.12 |
| Example 5 | 23 | o | 71 | 78 | 2.55 |
| Example 6 | 23 | o | 69 | 90 | 1.32 |
| Example 7 | 134 | o | 312 | 83 | 1.72 |
| Example 8 | 36 | o | 66 | 95 | 1.44 |
| Example 9 | 43 | o | 102 | 103 | 3.33 |
| Example 10 | 43 | o | 97 | 108 | 2.68 |
| Example 11 | 44 | o | 94 | 120 | 1.32 |
| Example 12 | 43 | o | 102 | 103 | 3.68 |

TABLE 1-continued

| | | | | | |
|---|---|---|---|---|---|
| Example 13 | 44 | ○ | 97 | 108 | 2.43 |
| Example 14 | 44 | ○ | 101 | 125 | 1.44 |
| Example 15 | 257 | ○ | 306 | 120 | 1.28 |
| Comparative Example 1 | 23 | x | 72 | 42 | 11.4 |
| Comparative Example 2 | 20 | ○ | 73 | 0 | — |
| Comparative Example 3 | 23 | x | 72 | 63 | 13.35 |
| Comparative Example 4 | 20 | ○ | 389 | 19 | 15.37 |
| Comparative Example 5 | 43 | x | 102 | 81 | 10.64 |
| Comparative Example 6 | 35 | x | 68 | 52 | 12.69 |

The processing devices shown in Table 1 are those described below.

Treating device (I): Theta composer from TOKUJU CO., LTD.

Treating device (II): Hybridization system from Nara Machinery Co., Ltd.

Treating device (III): Nobilta from Hosokawa Micron Corporation

The results in Table 1 show that the coating powder formed from the particulate composites obtained in Examples 1 to 15 have better adhesion and a smaller standard deviation of the adhesion strength than the coating powder obtained in Comparative Examples 1 to 6. The SEM photographs in FIGS. 1 to 4 show that the fluoropolymer and the adhesive polymer in the particulate composites obtained in the examples are bonded to each other. Also, the results of the underwater dispersion test show that the particulate composites obtained in the examples floated in water without making the water cloudy, while the powder mixtures obtained in the comparative examples made the water cloudy.

REFERENCE SIGNS LIST 31, 41: Polyamide-imide particles
32: PFA particles
42: ETFE particles
120: Particulate composite
121, 131: Fluoropolymer particles
122, 123, 132, 133: Adhesive polymer particles

The invention claimed is:

1. A particulate composite comprising:
a fluoropolymer;
an adhesive polymer; and
less than 0.1 ppm of a fluorosurfactant,
in which particles of the fluoropolymer and particles of the adhesive polymer are bonded to each other, and the particles of the adhesive polymer have an average particle size that is 2 to 20% of the average particle size of the fluoropolymer particles,
wherein the fluoropolymer is at least one fluororesin selected from the group consisting of a tetrafluoroethylene-perfluoro(alkyl vinyl ether) copolymer, a tetrafluoroethylene-hexafluoropropylene copolymer, and a tetrafluoroethylene-ethylene copolymer,
wherein the tetrafluoroethylene-perfluoro(alkyl vinyl ether) copolymer is a copolymer having the tetrafluoroethylene unit and perfluoro(alkyl vinyl ether) unit in a molar ratio of 80/20 to 98.5/1.5 (tetrafluoroethylene unit/perfluoro(alkyl vinyl ether) unit),
wherein the tetrafluoroethylene-hexafluoropropylene copolymer is a copolymer having the tetrafluoroethylene unit and hexafluoropropylene unit in a molar ratio of 80/20 to 97/3 (tetrafluoroethylene unit/hexafluoropropylene unit), and
wherein the tetrafluoroethylene-ethylene copolymer is a copolymer having the tetrafluoroethylene unit and ethylene unit in a molar ratio of 20/80 to 90/10.

2. The particulate composite according to claim 1, which is obtained by bonding particles of the fluoropolymer and particles of the adhesive polymer.

3. The particulate composite according to claim 1, which is obtained by bonding particles of the fluoropolymer and particles of the adhesive polymer with a device configured to cause centrifugal diffusion and a vortex.

4. The particulate composite according to claim 1, wherein the particles float in water.

5. The particulate composite according to claim 1, which has an average particle size of 1 to 1000 μm.

6. The particulate composite according to claim 1, which comprises the fluoropolymer and the adhesive polymer in a mass ratio of 50/50 to 99/1.

7. The particulate composite according to claim 1, wherein the adhesive polymer is at least one compound selected from the group consisting of polyimide, polyamide-imide, polyamide, polyamic acid, epoxy resin, polysulfide, polyarylene sulfide, and polyether sulfone.

8. A coating powder comprising the particulate composite according to claim 1.

9. A coating film formed from the coating powder according to claim 8.

10. A laminate comprising
a metal substrate, and
the coating film according to claim 9 which is adhered to the metal substrate with an adhesion strength of 50 to 300 N/cm.

11. The laminate according to claim 10,
wherein the adhesion strength between the coating film and the metal substrate has a standard deviation of less than 10.

12. A method for producing the particulate composite according to claim 1, the method comprising the steps of:
placing a fluoropolymer and an adhesive polymer in a surface treating device;
mixing the fluoropolymer and the adhesive polymer in the surface treating device to obtain a particulate composite; and
collecting the particulate composite from the surface treating device.

13. The method according to claim 12,
wherein the surface treating device is a high-speed fluidizing mixer, a high-speed rotary impact crusher, or an attrition mill.

14. The method according to claim 13,
wherein the surface treating device is an attrition mill.

15. The particulate composite according to claim 1, wherein the fluoropolymer particles have an average particle size that is 20 to 500 μm.

16. The particulate composite according to claim 1, wherein the adhesive polymer contains at least one polymer compound (A) selected from the group consisting of polyimides, polyamide-imides, polyamides, polyamide acids and epoxy resins, together with at least one sulfur-containing compound (B) selected from the group consisting of polysulfide, polyarylene sulfide and polyether sulfone.

* * * * *